United States Patent
Langner et al.

(10) Patent No.: US 10,012,541 B2
(45) Date of Patent: Jul. 3, 2018

(54) OPTICAL FILTER ELEMENT FOR DEVICES FOR CONVERTING SPECTRAL INFORMATION INTO LOCATION INFORMATION

(71) Applicant: TECHNISCHE UNIVERSITÄT DRESDEN, Dresden (DE)

(72) Inventors: Maik Langner, Dresden (DE); Hartmut Fröb, Glashütte (DE); Vadim G. Lyssenko, Dresden (DE); Markas Sudzius, Dresden (DE); Karl Leo, Dresden (DE)

(73) Assignee: TECHNISCHE UNIVERSITÄT DRESDEN, Dresden (DE)

( * ) Notice: Subject to any disclaimer, the term of this patent is extended or adjusted under 35 U.S.C. 154(b) by 0 days.

(21) Appl. No.: 15/517,323

(22) PCT Filed: Oct. 7, 2015

(86) PCT No.: PCT/DE2015/000504
§ 371 (c)(1),
(2) Date: Apr. 6, 2017

(87) PCT Pub. No.: WO2016/055048
PCT Pub. Date: Apr. 14, 2016

(65) Prior Publication Data
US 2017/0241838 A1 Aug. 24, 2017

(30) Foreign Application Priority Data
Oct. 7, 2014 (DE) .................. 10 2014 014 983

(51) Int. Cl.
*G01J 3/32* (2006.01)
*G01J 3/26* (2006.01)
(Continued)

(52) U.S. Cl.
CPC .............. *G01J 3/26* (2013.01); *G01J 3/0256* (2013.01); *G01J 3/0289* (2013.01); *G01J 3/28* (2013.01);
(Continued)

(58) Field of Classification Search
CPC .......... G01J 3/26; G01J 3/0289; G01J 3/0256; G01J 3/28; G01J 2003/1234; G02B 5/288
See application file for complete search history.

(56) References Cited

U.S. PATENT DOCUMENTS 3,747,021 A * 7/1973 Smiley .................. H01S 3/0632
372/20
4,395,769 A * 7/1983 Damen .................. H01S 5/041
372/20
(Continued)

OTHER PUBLICATIONS

International Search Report issued in PCT/DE2015/000504, dated Feb. 3, 2016.
(Continued)

*Primary Examiner* — Hwa Lee
(74) *Attorney, Agent, or Firm* — Heslin Rothenberg Farley & Mesiti P.C.

(57) ABSTRACT

An optical filter element for devices for converting spectral information into location information, uses a connected detector for detecting signals. The element has at least two microresonators, each comprising at least two superposed reflective layer structures of a material layer having a high refractive index and a material layer having a low refractive index in an alternating sequence, and at least one superposed resonance layer arranged between the two superposed reflective layer structures. The filter element comprises at least one transparent plane-parallel substrate for optically decoupling the two microresonators; the first microresonator being located on a first of two opposing surfaces of said substrate, and the second microresonator being located on
(Continued)

said substrate on a second surface thereof that lies opposite the first surface. The resonance layer of at least one micro-resonator, and/or the reflective layer structure that surrounds said resonance layer, has a layer thickness which can vary along a horizontal axis of said filter element.

14 Claims, 8 Drawing Sheets

(51) Int. Cl.
    *G01J 3/02*       (2006.01)
    *G01J 3/28*       (2006.01)
    *G02B 5/28*      (2006.01)
    *G01J 3/12*       (2006.01)

(52) U.S. Cl.
    CPC ...... *G02B 5/288* (2013.01); *G01J 2003/1234* (2013.01)

(56) References Cited

U.S. PATENT DOCUMENTS

| | | | |
|---|---|---|---|
| 4,957,371 A * | 9/1990 | Pellicori | G01J 3/12 250/226 |
| 4,958,363 A * | 9/1990 | Nelson | B82Y 10/00 378/145 |
| 5,144,498 A | 9/1992 | Vincent | |
| 5,218,473 A * | 6/1993 | Seddon | G01J 3/26 359/580 |
| 5,872,655 A * | 2/1999 | Seddon | G02B 1/10 359/359 |
| 6,057,925 A | 5/2000 | Anthon | |
| 6,621,614 B1 * | 9/2003 | Zhang | G02B 5/284 349/198 |
| 6,768,097 B1 * | 7/2004 | Viktorovitch | G01J 3/26 250/226 |
| 6,785,002 B2 * | 8/2004 | Zarrabian | G01J 3/02 356/454 |
| 7,633,629 B2 * | 12/2009 | Kiesel | G01J 3/26 356/517 |
| 7,701,590 B2 * | 4/2010 | Kiesel | G01J 9/0246 356/454 |
| 9,261,634 B2 * | 2/2016 | Hendrix | H01L 27/14685 |
| 2003/0012230 A1 * | 1/2003 | Hopkins | H01S 5/141 372/20 |
| 2003/0058447 A1 | 3/2003 | Yamada et al. | |
| 2004/0032584 A1 | 2/2004 | Honda et al. | |
| 2004/0085661 A1 * | 5/2004 | Tempea | G02B 1/115 359/883 |
| 2006/0039009 A1 * | 2/2006 | Kiesel | G01J 3/26 356/519 |
| 2007/0146888 A1 | 6/2007 | Schmidt et al. | |
| 2007/0148760 A1 | 6/2007 | Klesel et al. | |
| 2008/0285165 A1 * | 11/2008 | Wu | G01J 3/02 359/885 |
| 2010/0092083 A1 | 4/2010 | Herloski et al. | |
| 2017/0241836 A1 * | 8/2017 | Langner | G01J 3/0259 |
| 2017/0241838 A1 * | 8/2017 | Langner | G01J 3/26 |

OTHER PUBLICATIONS

Emadi et al., "Linear variable optical filter-based ultraviolet microspectrometer," Applied Optics, 51(19):4308-4315 (2012).

* cited by examiner

OPTICAL FILTER ELEMENT FOR DEVICES FOR CONVERTING SPECTRAL INFORMATION INTO LOCATION INFORMATION

CROSS REFERENCE TO RELATED APPLICATIONS

This application is the National Phase filing under 35 U.S.C. § 371 of International Application No. PCT/DE2015/000504, filed on Oct. 7, 2015, and published on Apr. 14, 2016, as WO/2016/055048 A1, and claims priority to German Application No. 102014014983.8, filed on Oct. 7, 2014. The contents of each of the prior applications are hereby incorporated by reference herein in their entirety.

BACKGROUND ART

The invention pertains to an optical filter element for devices for converting spectral information into location information with a connected detector for detecting signals, wherein said element comprises at least two microresonators, and wherein a microresonator at least features
- at least two surface-covering reflective layer structures consisting of at least one material layer with a high refractive index and at least one material layer with a low refractive index in an alternating sequence, as well as
- at least one surface-covering resonance layer that is arranged between the two respective surface-covering reflective layer structures.

PRIOR ART

The spectral analysis of optical signals requires a separation into individual wavelengths, which are subsequently evaluated by being converted into an electrically usable data stream by means of signal converters. This is realized with a conversion of the spectral information into location information. Until now, diffractive/refractive elements (diffraction gratings, prisms) were used for this purpose, wherein these elements must have sufficient geometric dimensions in order to achieve a high spectral resolution (i.e. sufficiently wide separation of the incident light radiation). In addition, the mutual alignment of the optical elements must have a sufficient thermal and mechanical stability for preventing systematic errors during the measurement. Consequently, previous spectrometers are not suitable for all operating sites or the costs for the respective application are excessively high.

The technical developments of spectrometers in recent years have led to a miniaturization, as well as a cost reduction. The latest devices fit into a user's hand (e.g.: USB spectrometer) and nevertheless reach a sufficient resolution (≈1 nm FWHM) and an acceptable signal-to-noise ratio (1:1000). The basic principle of the measurement has not changed significantly. The input signal is projected on a dispersive element via an optical system (e.g.: lens system, optical fiber) and an entry slit. Prisms or gratings are typically used in this case. The signal, which is thereby spectrally separated by the dispersive element, is then directed at a detector, the signals of which can subsequently be additionally processed. In order to ensure that the separated signal can be resolved by the individual elements of the detector, the signal path has a length that is dependent on the deflection angle of the dispersive element. This length cannot be arbitrarily reduced such that spectrometers based on this principle have minimum dimensions.

An alternative implementation of a spectrometer utilizes a band-pass filter with locally variable filter characteristic in connection with a detector unit. The filter elements described in publication U.S. Pat. No. 6,057,925 A under the designation LVF "linear variable filter" elements are based on interference effects and typically consist of a layer system comprising metallic and/or dielectric thin layers, which are technically applied on a substrate in such a way that the layer thicknesses and therefore the transmission properties vary in one direction. The individual components of the input signal are thereby attenuated to different degrees in a location-dependent fashion. A prior calibration makes it possible to obtain the spectral information from the position of the active detector elements. Due to the flat design of the filter and of the detector, the spectrally resolving and measuring part of the component can be realized particularly compact and robust.

If the interference effect is used for the separation of the light, however, the filter is dependent on the direction of the incident light. The farther the angle of incidence lies from a perpendicular incidence, the more significantly the spectral filter properties shift toward shorter wavelengths. Consequently, a definitive correlation between active detector element and filtered wavelength no longer exists and the practical spectral resolution deteriorates significantly in comparison with the theoretically attainable resolution (defined by filter characteristic and detector resolution). In order to prevent this directionally dependent effect, the input signal has to be optically adapted accordingly before/while it passes through the component such that it lies within a narrow angular range.

The fundamental design and the function of such an integrated system for use in telecommunications is described with reference to the separation of multiplexed signals in publication U.S. Pat. No. 6,785,002 B2 "Variable filter-based optical spectrometer" or in publication US 2004/032584 A "Optical channel monitoring device." In this case, the light decoupled from an optical fiber is incident on a lens system and subsequently projected on the filter element in a collimated fashion. The individual spectral components are subsequently detected by means of a sensor array behind the filter element. In order to achieve a high resolution, it is proposed to utilize an etalon with dielectric mirrors for the variable filter element.

Publication US 2003/058447 A1 "Colorimeter apparatus for color printer ink" describes a component, in which the directional selection is realized by means of a matrix of glass fibers or a flat collimator arrangement between the detector and the filter. A second glass fiber matrix or collimator can be used on the entry side of the filter in order to further increase the resolution.

Another noteworthy variation for the directional restriction of the incident signals are self-focusing lens arrays, for example, of the type described in publication US 2010/092083 A1 "In-line linear variable filter based spectrophotometer."

Another spectroscopy variation by means of linear variable filters is described in publication U.S. Pat. No. 5,144,498 A "A variable wavelength light filter and sensor system." In this case, incident light is reflected on up to two variable filters and thereby deflected on an optional third filter element and subsequently the detector. In this configuration, the filters may also be located on the lateral surfaces of an equilateral prism.

The above-described solutions have the disadvantage that an optical system, which is to some extent spatially extensive, or an additional component, which can only be manufactured with complex manufacturing technology, is required for obtaining suitable spectroscopic information from the combination of variable a band-pass filter and a detector.

Publication US 2007/0148760 A1 describes a method for detecting chemicals and biomolecules comprising the following steps:
generating light from a light source,
inputting light onto/into an optical sensor that outputs a narrow band of optical wavelengths when it is illuminated with a broad band of optical wavelengths,
propagating the output light from the sensor to a detector with an entry surface that comprises at least/not less than one layer with a laterally variable transmission property, and
utilizing the position of the output light by means of the detector in order to detect the presence of an analyte (chemical or biomolecules).
The corresponding device comprises
a light source that generates a broad band of optical wavelengths,
an optical sensor that outputs a narrow band of optical wavelengths when it is illuminated with the broad band of optical wavelengths from the light source,
a detector that comprises at least one layer with laterally variable transmission properties when the detector receives output light from the optical sensor, wherein at least one layer transmits part of the received light at one position of the at least one layer and the detector uses the position for detecting the presence of the analyte.

Publication US 2007/0148760 A1 furthermore describes a method for obtaining information on an analyte comprising the following steps:
generating an analyte stimulus for an analyte wavelength converter such that the converter in response generates output light, wherein the output light indicates analyte information,
propagating the output light to an entry surface of a transmission structure, wherein the transmission structure has an exit surface that comprises a set of two or more positions, and
wherein the transmission structure is a layered structure with a laterally variable energy transmission function, and transmitting the output light through the transmission structure to the exit surface such that relative quantities of photons generate a set of positions, wherein the relative quantities indicate the analyte information.

The corresponding device comprises an analyte wavelength converter that responds to an analyte stimulus by generating output light indicating the analyte information, a transmission structure with an entry and an exit surface, wherein the exit surface comprises a set of at least two positions, and wherein the transmission structure is a layered structure with a laterally variable energy transmission function, and a propagation component that propagates the output light from the converter to the entry surface of the transmission structure, wherein the transmission structure generates photons at the set of positions of the exit surface in response to the output light such that the relative quantities of the photons generate a set of positions that indicate the analyte information.

One disadvantage of the two latter solutions can be seen in that the light signal to be analyzed has to be aligned as parallel as possible prior to its incidence in order to achieve an adequate resolution. Additional optical components such as lenses or blades are required for this purpose.

Publication U.S. Pat. No. 6,768,097 B1 describes an optoelectronic device, in which a coupling of two spaced-apart microresonators is used for filtering wavelengths. In this case, a first microresonator has comparatively large dimensions (a few 100 μm) such that a multitude of resonances or a so-called frequency comb is created. In contrast to the first microresonator, the second microresonator has dimensions on the order of its resonance wavelengths. In addition, the resonance layer of the second (thin) microresonator can be electrically activated in order to change its optical properties (thickness, refractive index).

This makes it possible to filter out one of the resonances of the frequency comb.

However, this device has the disadvantage that the frequency comb of the first microresonator does not allow a continuous spectrum during the measurement. Furthermore, the selection of the signal transmitted through both microresonators requires an electric activation. This also represents another disadvantage, wherein a measurement of a broad spectrum is only required in series such that the temporal resolution is limited.

OBJECTIVE

The invention is based on the objective of disclosing an optical filter element for devices for converting spectral information into location information, wherein said filter element is suitably designed in such a way that its integration into spectroscopy or spectrometry devices in alignment with the light signal is realized in a space-saving fashion and therefore cost-effectively.

DESCRIPTION

The optical filter element for devices for converting spectral information into location information with a connected detector for detecting signals comprises at least two microresonators, wherein a microresonator at least features
at least two surface-covering reflective layer structures consisting of at least one material layer with a high refractive index and at least one material layer with a low refractive index in an alternating sequence, as well as
at least one surface-covering resonance layer that is arranged between the two respective surface-covering reflective layer structures,
wherein the filter element comprises according to the characterizing portion of claim 1 at least a transparent, plane-parallel substrate for optically decoupling the two microresonators,
wherein the first microresonator is located on a first of the two opposite surfaces of the substrate,
wherein the second microresonator is located on the substrate on a second surface thereof, which lies opposite of the first surface, and
wherein the resonance layer of at least one microresonator and/or the respective reflective layer structure surrounding the resonance layer have a variable layer thickness along the horizontal axis of the filter element.

The devices preferably consist of spectroscopic/spectrometric devices.

In the context of the invention, the term optical filter elements refers to structures, which upon introduction into a light path interact with the photons in such a way that a measurable portion of the photons is missing after the light passes through the filter. According to the invention, only a spectrally narrow band is transmitted through the filter element whereas the remaining spectrum is completely reflected or absorbed in the structure, respectively.

In the context of the invention, the term spectrometric or spectroscopic applications refers to methods and devices, in which radiation is resolved and a spectral measurand (wavelength, intensity) is allocated to a readable detector element.

In the context of the invention, the term conversion from spectral information to location information refers to the filter element functioning in such a way that the light is incident on the entire surface of the filter and, after passing through the filter element, separated into the individual spectral components over the spatial extent of the filter element depending on its design.

In the context of the invention, the term detector refers to optoelectronic sensors, in which photons are converted into an electrical signal due to the photoelectric effect. Such sensors include, among other things, photocells, photomultipliers or CMOS/CCD elements and photodiodes.

According to the invention, the detector comprises a series of individual sensor elements that are configured, e.g., in the form of an array or matrix. In this case, the shape/size and the spectral sensitivity of the individual elements may differ.

In the context of the invention, the term signal refers to electromagnetic radiation that is incident on the filter monochromatically (one frequency/wavelength) or in the form of a broad spectral band. In this case, the signal may have a temporal intensity modulation (individual pulse, periodic and aperiodic variation) or a constant intensity distribution. In the context of the invention, the term microresonator refers to the component that interacts with electromagnetic radiation in such a way that standing waves can form in the interior (resonance layer). For this purpose, its walls are realized in the form of (partially) reflective peripheral surfaces.

In this case, it is vital that at least one direction in space has an extent on the order of the spectral range to be analyzed, e.g. for light from a few 10 nm to a few µm. With respect to the described filter element, this direction in space extends perpendicular to the surface area of the films/surfaces of the substrate.

According to the invention, the term surface-covering layer structure refers to a sequence of interconnected material layers (e.g.: metal oxides, metals, polymers, organic molecules, etc.) that respectively have planar dimensions between a few mm$^2$ and several 100 cm$^2$ and a thickness on the order of a few 10 nm to a few 100 nm, wherein just one boundary surface is respectively formed between two materials and the dimensions of said boundary surface insignificantly deviate from those of the materials. The successive boundary surfaces in a structure with more than two layers extend parallel to one another in one dimension. Due to the ratio of their dimensions, the layers are also referred to as films.

These films are manufactured with a method according to the prior art such as, e.g., vacuum sublimation, sputtering methods, centrifugal methods or dipping methods.

In the context of the invention, the term reflective refers to highly reflective photonic structures, which are also referred to as dielectric mirrors and on which a majority of the radiation (nearly 100%) is completely reflected within a broad spectral band (a few 10 nm—a few 100 nm) by means of interference effects. In contrast to metallic mirrors, the efficiency is nearly 100% because no or almost no radiation is usually absorbed. A dielectric mirror with a simple design consists of an alternating sequence of layers of materials that are respectively transparent for the relevant wavelength range and differ with respect to their refractive index. In the visible spectrum, for example, this would be the materials silicon dioxide (n_SiO2=1,46) and titanium dioxide (n_TiO2=2,3-2,6), which are respectively adjusted to an optical thickness n×d of one-fourth the maximum wavelength to be reflected. Reflection values >99% can be achieved with approximately 7-9 alternating layer pairs. Additional layers or layer stacks with precisely calculated layer thickness deviations may be added for adaptations of the concrete reflection characteristics in a broad spectral range of several 100 nm.

In the context of the invention, the term variable layer thickness refers to a purposefully adjusted profile of the thickness along a horizontal axis, in which the layers extend in a planar fashion. This profile may have discrete steps or change continuously. One potential configuration is a wedge shape, e.g., for a resonance layer, in which the layer thickness increases by 10 nm-20 nm per mm in the horizontal direction. The smaller the variation per length unit, the higher the spectral resolution or the sensitivity when larger detectors are used, wherein the horizontal dimensions are thereby increased, but the measuring range remains the same.

Manufacturing methods for variable layer thicknesses comprise, among other things, dipping methods with time-variable depth of immersion, layers that are obliquely vapor-deposited or sputtered on a substrate or alternatively time-variable blades that shield a source. The blades may inhomogeneously cover the growing layer periodically (e.g.: rotatingly), as well as increasingly from the beginning to the end of the deposition.

At least one section of the reflective layer structure and/or at least one resonance layer may consist of a dielectric material.

At least one of the reflective layer structures may consist of a layer stack comprising optically transparent materials with a high refractive index and a low refractive index in an alternating sequence.

At least one resonant mode of the microresonators has a transmittance greater than 10%, preferably greater than 50%, particularly greater than 90%.

The geometric design and/or the material composition of both microresonators may be realized symmetric to the substrate plane.

In the filter element, the layer thickness profile of the reflective layers along a horizontal axis of the component or filter element may be correlated with the profile of the resonance layer thickness.

The first resonance layer of the first microresonator may consist of a different dielectric material than the second resonance layer of the second microresonator such that their resonant mode(s) may respectively have a dispersion parabola with different curvatures.

The surface of the substrate may have comparatively small dimensions perpendicular to the direction of the layer gradient.

Elongated absorptive wall elements may be arranged on the sides of the filter element referred to the direction of irradiation.

A locally variable optical filter element, in which a spectral preselection of the incident signal is carried out by means of absorptive, transmissive or reflective band-pass filters, may be arranged upstream of one of the microresonators.

A spectroscopic/spectrometric device for converting spectral information into location information comprises at least
- a light source,
- a detector,
- an evaluation unit that is connected to the detector via a connecting line,
- a display unit and
- an above-described inventive filter element, wherein the filter element is according to the characterizing portion of claim 11 designed in such a way that it transmits a short-wave component of the light from the light source in the region transparent for short waves after the light passes through the filter element and a long-wave component of the light from the light source in the region transparent for long waves after the light passes through the filter element, and that it reflects a long-wave component of the light from the light source in the region transparent for short waves after the light is incident on the filter element and a short-wave component of the light from the light source in the region transparent for long waves after the light is incident on the filter element.

The spectroscopic/spectrometric device may feature a detector in the form of a photoelectric series/matrix converter that is based on a CCD, a photodiode or a multiplier.

The band-pass filter of the inventive filter element is realized in such a way that a collimation takes place within the filter element and no other optical elements are required. In this way, particularly compact and cost-effective spectroscopic components and devices can be realized.

In summary, the following can be established.

The inventive optical filter element is arranged upstream of a detector (CCD matrix, diode row, diode array) in the form of a spectral (linear) graduated filter. The graduated filter advantageously consists of at least one photonic crystal, wherein the layer thickness of at least one layer is variable in dependence on the location. The graduated filter reflects all incident optical signals in a broad spectral band with the exception of a resonance that is specific to the structure and dependent on the position. The non-reflected narrow spectral range (potentially <1 nm) passes through the filter in a nearly unobstructed fashion and can subsequently be converted into an electrical signal in the detector arranged directly downstream of the filter.

The invention therefore concerns an optical filter element for separating the electromagnetic spectrum in the UV to IR range, wherein said optical filter makes it possible to separate an electromagnetic broadband signal into its individual components in combination with a downstream signal converter (spectroscopy, spectrometry). The described invention requires no upstream optical elements for signal conditioning purposes such that a compact integrated element can be realized.

An arrangement of at least two variable microresonators is used for separating the electromagnetic signal into its individual components, wherein said microresonators are respectively located on the opposite surfaces of a transparent plane-parallel substrate.

If Fabry-Perot interferometers are used for the variable optical microresonators, a good to very good signal-noise-ratio can be achieved with high spectral resolution. The respective spectral width and the position of the measuring range on the one hand and a high directional sensitivity or a very high individual signal separation on the other hand can be achieved by adapting the parameters of the filter element. The compact design of the filter element simultaneously allows the integration into a multitude of processes, which were not accessible to optical spectroscopy so far.

Methods for manufacturing thin-film systems known from the prior art such as, among other things, vacuum coating processes (PVD, CVD) and sol-gel processes, may be used for the manufacture of the filter element.

In addition to the transparent substrate, variable band-pass filters are a key aspect of the optical filter element. In this context, the term optical filter element refers to a component, which upon irradiation with an electromagnetic signal of any spectral composition in the wavelength range of 100 nm-10 μm (UV-IR) reflects or transmits, if applicable also absorbs, components of the spectrally composite electromagnetic signal to different degrees. The signal component is defined by the concrete design of the filter element and may comprise spectral bandwidths from the sub-nm range to a few 100 nm (band-pass/band-stop), but also stop down individual ranges of the optical spectrum (e.g.: transmission of short wavelengths by utilizing a short-pass filter.

The substrate used in the described invention has a sufficient transparency in excess of 25% for the intended wavelength range to be analyzed. For example, solid bodies of glass in the UV/VIS range or silicon in the IR range may be considered as substrate materials, but plastics or equivalent polymers can also be used. The substrate generally has planar shape with an edge length of a few millimeters to a few centimeters. The third dimension in the form of the thickness is a decisive parameter for the function of the inventive filter element and lies between a few $1/10$ of a millimeter and a few millimeters. This ensures that the two microresonators are optically decoupled. Consequently, no interaction leading to a common resonance takes place between the microresonators, wherein such a common resonance manifests itself in the form of degeneration and consequently leads to line broadening and a deteriorated resolution of the filter.

Both extensive surfaces (which are referred to as first surface and opposite second surface of the substrate below) are aligned plane-parallel to one another such that the thickness of the substrate is constant over the entire usable surface area. A high surface quality is furthermore advantageous in order to prevent scattering effects.

BRIEF DESCRIPTION OF THE DRAWING FIGURES

A few exemplary embodiments of the invention are described in greater detail below with reference to the drawings.

In these Drawings:

FIG. 2 shows angle-dependent transmission spectrums of microresonators, which are calculated for a wavelength of 550 nm, wherein

DETAILED DESCRIPTION

Figure 1:
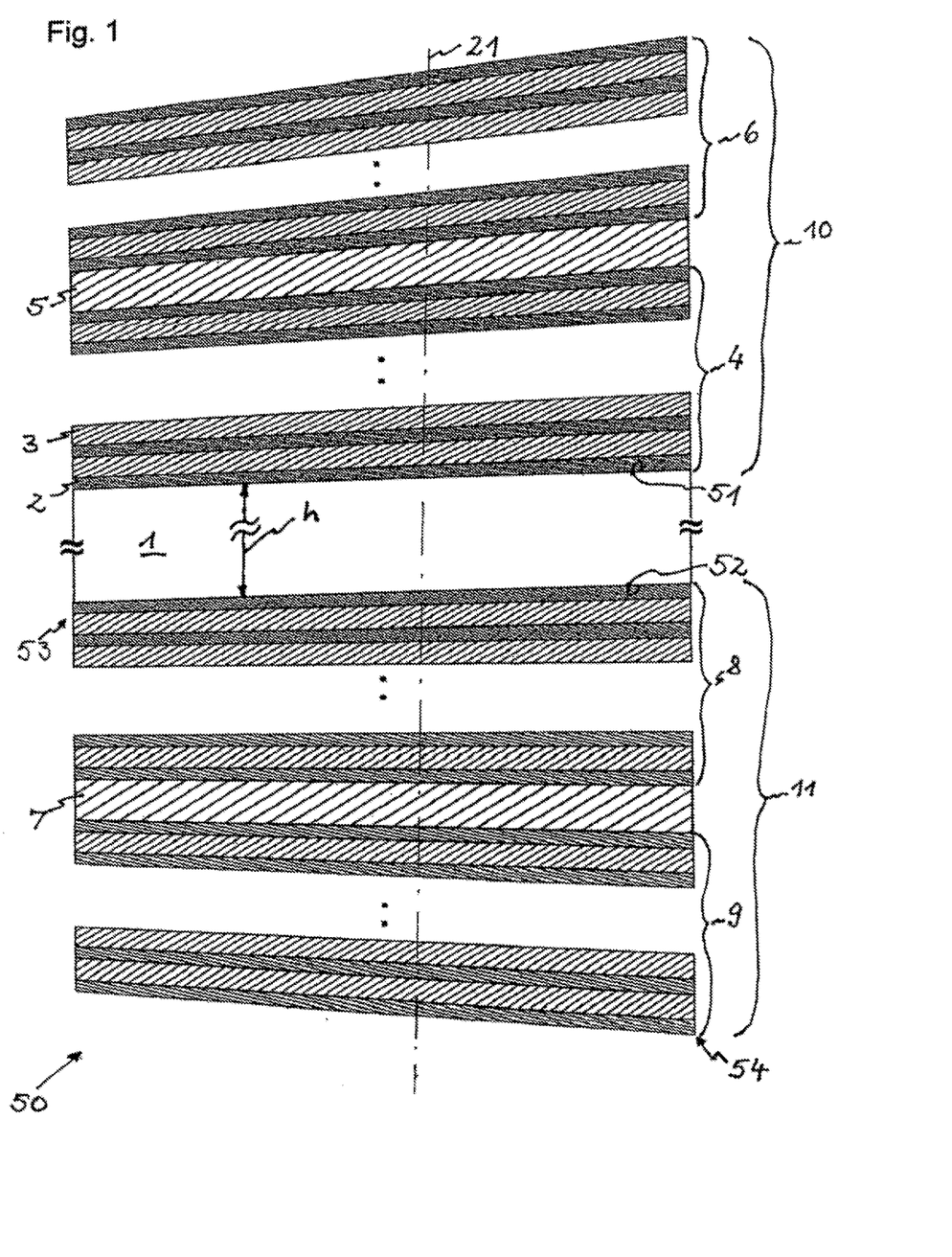
FIG. 1 shows a schematic side view of a general exemplary embodiment of the optical filter element.

FIG. 1 schematically shows the design of an optical filter element 50, e.g., for a spectroscopic or spectrometric device for converting spectral information into location information.

The optical filter element 50 comprises at least two microresonators 10, 11, wherein a microresonator 10; 11 at least features
- at least two surface-covering reflective layer structures 4, 6; 8, 9 consisting of at least one material layer 2 with a high refractive index and at least one material layer 3 with a low refractive index in an alternating sequence, as well as
- at least one surface-covering resonance layer 5; 7 that is arranged between the two respective surface-covering reflective layer structures 4, 6; 8, 9.

According to the invention, the filter element 50 comprises at least a transparent, plane-parallel substrate 1 for optically decoupling the two microresonators 10, 11, wherein the first microresonator 10; 11 is located on a first of the two opposite surfaces 51; 52 of the substrate 1, wherein the second microresonator 11; 10 is located on the substrate 1 on a second surface 54 thereof, which lies opposite of the first surface 51, and wherein the resonance layer 5; 7 of at least one microresonator 10, 11 and/or the respective reflective layer structure 4, 6; 8, 9 surrounding the resonance layer 5; 7 have a variable layer thickness along the horizontal axis 25 of the filter element 50.

The substrate 1, which is transparent for the spectral range to be analyzed, is arranged centrally and has plane-parallel, optically smooth surfaces 51 and 52. In this case, the thickness h of the substrate 1 in combination with the relative thickness gradients of the dielectric layers 2, 3 forms a decisive parameter for the respective directional selectivity or resolution of the filter element 50. A first layer stack 4, which acts as a broadband reflector (one-dimensional photonic crystal) is now produced on the first surface 51 of the substrate 1 by alternately depositing dielectric material layers 2 with a high refractive index and dielectric material layers 3 with a low refractive index. In FIG. 1, the first dielectric layer stack 4 does not have a constant thickness, but rather a continuous layer thickness gradient. The relative difference in thickness between the two lateral surfaces 53 and 54 of the filter element 50 is defined by the required width of the measuring range. The number of individual alternating layers 2 and 3 defines the resolution of the optical filter element 50. The utilization of many layers 2 and 3 allows a superior separation of signals that lie close to one another, but can have negative effects on the sensitivity and also increases the manufacturing requirements.

A resonance layer 5 is now applied on the first reflector 4, wherein this resonance layer corresponds in optical respects to a fault of the photonic crystal. Its thickness typically corresponds to a multiple of the thickness of the material layer 2 and the material layer 3. The material layer 2 and the material layer 3 also have a respective layer gradient that is adapted to the relative layer thickness profile of the reflector 4.

The first part of the filter element 50 is finished with a second dielectric reflector 6 such that a so-called microresonator 10 with locally variable layer thickness and therefore continuously variable transmission characteristics is formed. As in any resonator, at least one frequency corresponding to the geometry is amplified in the microresonator 10 due to multiple reflection and all other components of the spectrum are suppressed.

The electromagnetic radiation within the measuring range, which is incident on the first part, is spectrally separated locally and can pass through the substrate 1. In order to circumvent the intrinsic dispersion problem of the microresonator 10, which would make a calibration impossible, it is necessary to restrict the direction of the signal to be measured. According to the invention, a second microresonator 11 with similar geometry is used for this purpose. The second microresonator 11 is likewise composed of a first dielectric mirror 8 and a second dielectric mirror 9, as well as a resonance layer 7 arranged between the two mirrors/reflectors 8 and 9.

In the simplest case, the second microresonator 11 consists of a completely symmetric image of the first microresonator 10. However, it may also comprise a different number of layers 2, 3 or have a different material composition or the thickness of the resonance layers 5 and 7 may vary. It is decisive that the resonant wavelength(s) for a defined angle correspond over the entire filter element 50. The layer thickness gradients are adapted to one another accordingly.

Figure 2A:
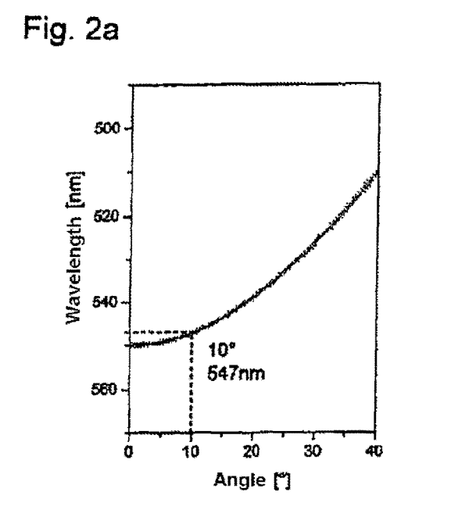
FIG. 2a shows a resonance layer of silicon dioxide and 100% layer thickness.
Figure 2B:
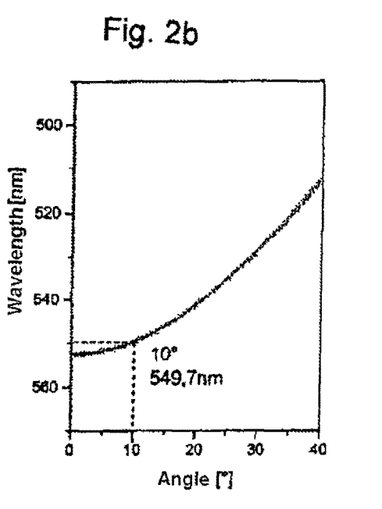
FIG. 2b shows a resonance layer of silicon dioxide and 100.5% layer thickness
Figure 2C:
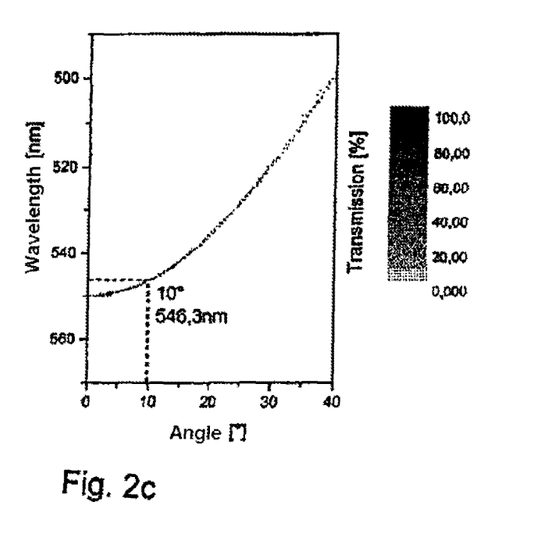
FIG. 2c shows a resonance layer with quadruple thickness of magnesium fluoride and 100% layer thickness.

FIG. 2 shows the angle-dependent transmission spectra of the microresonators 10 and 11, which are calculated for a wavelength of 550 nm, wherein FIG. 2a shows a resonance layer of silicon dioxide and 100% layer thickness, FIG. 2b shows a resonance layer of silicon dioxide and 100.5% layer thickness and FIG. 2c shows a resonance layer with quadruple thickness of magnesium fluoride and 100% layer thickness.

In this case, the typical energetic extent of a resonant mode (dispersion) is illustrated for three different calculated models of microresonators 10. At normal material dispersion, the spectrally narrow (<1 nm FHWM) transparent range shifts toward shorter wavelengths (higher energies) as the angle of incidence increases, namely in accordance with $\sim 1/(n\, d\, \cos(\alpha))$. In this case, n is the refractive index of the material, d is the thickness of the resonance layer 5 and $\alpha$ is the propagation angle.

Actual material values are used for the calculation. The exemplary filter element 50 is formed by a dielectric mirror 4 consisting of alternating layers 2 and 3 of titanium dioxide and silicon dioxide with a thickness of 550 nm/$(4n_{material})$. 7.5 pairs are arranged on a glass substrate 1 followed by the resonance layer 5, and a second dielectric mirror 6 is arranged thereon. The thickness of the individual layers 2, 3 corresponds:

in FIG. 2a to 100% of the thickness of 550 nm/$(4n_{material})$, wherein a silicon dioxide layer with a thickness of 550 nm/$(2n_{silicon\ dioxide})$ is used as resonance layer 5, in FIG. 2b to 100.5% of the thickness of 550 nm/$(4n_{material})$, wherein a silicon dioxide layer with a thickness, which is likewise increased to 100.5% of the value 550 nm ($2n_{silicon\ dioxide}$) is used as resonance layer 5, and in FIG. 2c to 100% of the thickness of 550 nm/($4n_{material}$), wherein a magnesium fluoride layer with a thickness of (2·550 nm)/nmagnesium fluoride) is used as resonance layer 5.

These figures show that deviations exist despite the very similar profile. A comparison between the spectrum in FIG. 2a and the spectrum in FIG. 2b elucidates the influence of the layer thickness d of the resonance layer 5 on the position of the resonant mode. The increase by 0.5% (corresponding to a physical thickness of 1 nm) shifts the entire dispersion parabola toward longer wavelengths by nearly 3 nm. A crossover of the resonance between FIG. 2a in FIG. 2b no longer occurs at any angle if both modes have a sufficiently narrow resonance width (<1 nm).

The spectrum in FIG. 2c elucidates the steep rise of the corresponding dispersion parabola resulting from the lower refractive index of magnesium fluoride, as well as the quadrupled layer thickness. A comparison between the spectrum in FIG. 2a and the spectrum in FIG. 2c elucidates that the resonant modes cross one another at small angles and diverge as the angle increases (resonance respectively determined, e.g., for 10°).

Figure 3:
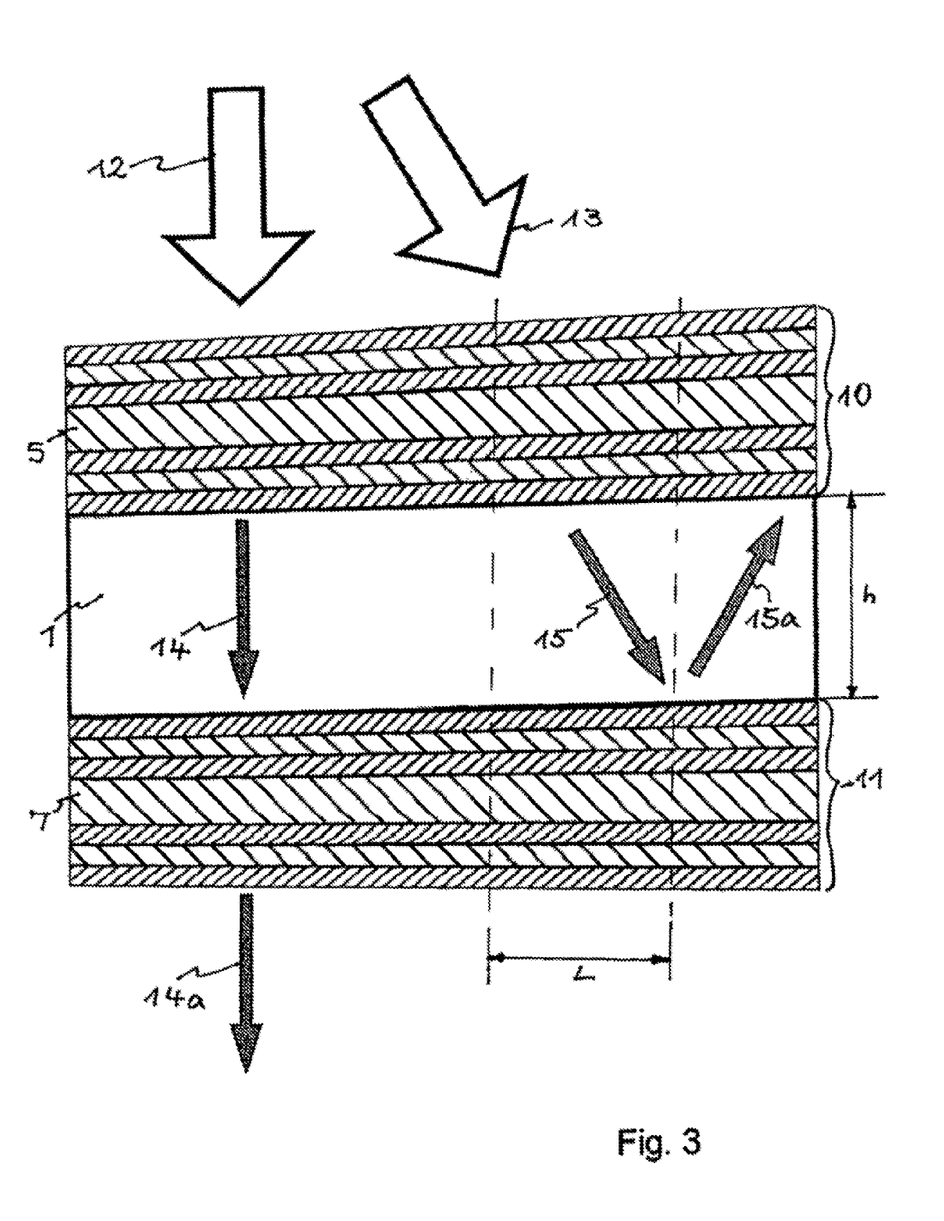
FIG. 3 shows a schematic representation of the functional principle of the directional selection of incident electromagnetic signals by means of the varying optical geometry along a layer thickness gradient.

FIG. 3 shows the functional principle of the directional selection of the filter element 50 according to FIG. 1 based on the effects described with reference to FIG. 2. Both microresonators 10, 11 have the same gradient and are located on opposite surfaces of the substrate 1 with a thickness h. A signal 12 is incident on the first microresonator 10 perpendicularly and the corresponding signal component of the intermediate signal 14 indicated at 0° in FIG. 2a is transmitted, as well as incident on the second microresonator 11 after passing through the substrate 1. Since both resonators 5 and 7 are realized symmetrical, the second microresonator 11 has the same transmission characteristics at the entry position of the signal component 14 such that the signal component 14 can pass through the second microresonator 11 (if applicable in attenuated form) and be detected in the form of an output signal 14a.

If a signal 13 is incident on the first microresonator 10 at a greater angle, the signal component 15 according to FIG. 2a corresponding to this angle is transmitted as resonant mode, wherein the wavelength is in this case shorter than in a perpendicular incidence of the signal 12. This mode travels along the layer thickness gradient of the microresonators 10, 11 by a segment L, which results from the substrate thickness h and the angle of incidence of the obliquely incident signal 13, within the relatively thick substrate 1 in comparison with the microresonators 10, 11.

At the entry position to the second microresonator 11, the obliquely incident signal 13 is now incident on a different layer thickness (thinner or thicker) due to the gradient. Consequently, the dispersion parabolas no longer cross at any point and the angle of inclination is simultaneously preserved as elucidated above with reference to FIG. 2 such that the signal 15 is reflected in the form of a signal 15a rather than transmitted. The spectral resolution (finesse) of the individual microresonators 10, 11, the thickness h of the substrate 1 and the relative layer thickness gradient are decisive for the acceptance angle, at which a resonant mode passes through both microresonators 10, 11.

Figure 4A:
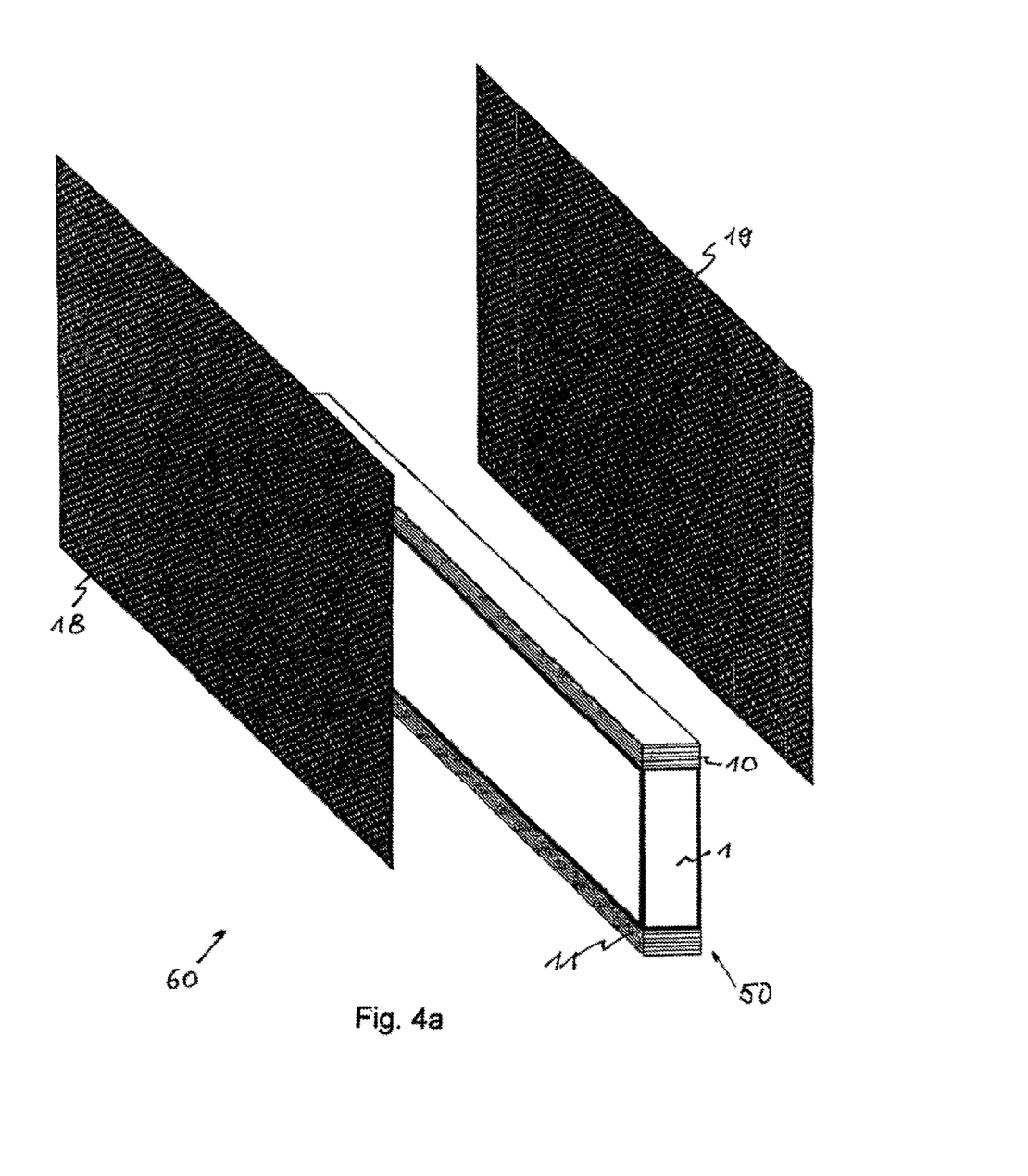
FIG. 4a shows a schematic representation of an exemplary embodiment of the filter element with additional direction-restricting elements.

FIG. 4a shows an exemplary embodiment of a component 60 with filter element 50, in which highly absorptive wall elements 18, 19 ensure that a directional selection also takes place perpendicular to the thickness gradient of the microresonators 10, 11. In this direction, the identical geometry ensures that the transmission parabolas according to FIG. 2 overlap such that a wavelength calibration under obliquely incident light of the input signal 13 would be impossible. An angular range of the input signal 13 is now selected with the aid of the wall elements 18, 19. For this purpose, the dimensions of the filter element 50 perpendicular to the gradient are significantly smaller, wherein line elements, for example, can potentially be used as sensors in this case.

Figure 4B:
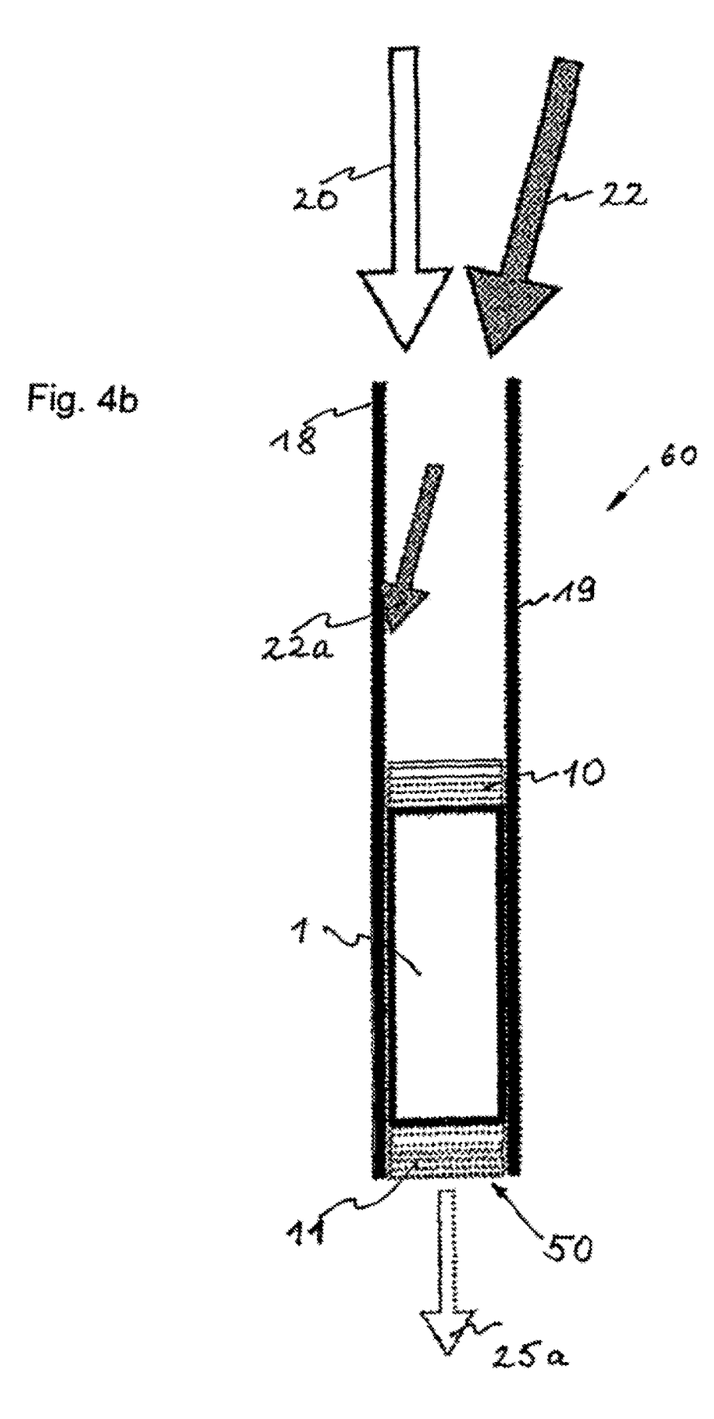
FIG. 4b shows a side view of the exemplary embodiment according to FIG. 4a with an illustration of the functional principle.

FIG. 4b shows the specific exemplary embodiment of the component 60 according to FIG. 4a in the form of a side view in order to demonstrate the selection of the angle of inclination of the incident signal 22. If the input signal 20 is incident into the component 60 with the filter element 50 perpendicularly within the plane shown, it is not affected by the wall elements 18, 19 and, after passing through the microresonators 10, 11, can subsequently be detected on the rear side in the form of a signal 25a in accordance with FIG. 3. However, a beam 22 inclined by a sufficiently large angle is incident on one of the wall elements 18, 19 on its path through the component 60 and absorbed by the respective wall element in the form of a signal 22a. The acceptance angle and consequently the spectral resolution of the filter element 50 within the plane shown are defined by the ratio between wall height and wall distance of the wall elements 18, 19. This allows a miniaturization of the entire component 60 if the width of the filter element 50 perpendicular to the layer gradient is very narrow. However, the dimensions should amount to a multiple of the average wavelength to be analyzed in order to suppress diffraction effects and to simultaneously obtain a sufficiently strong input signal for a high signal-to-noise ratio.

Figure 5:
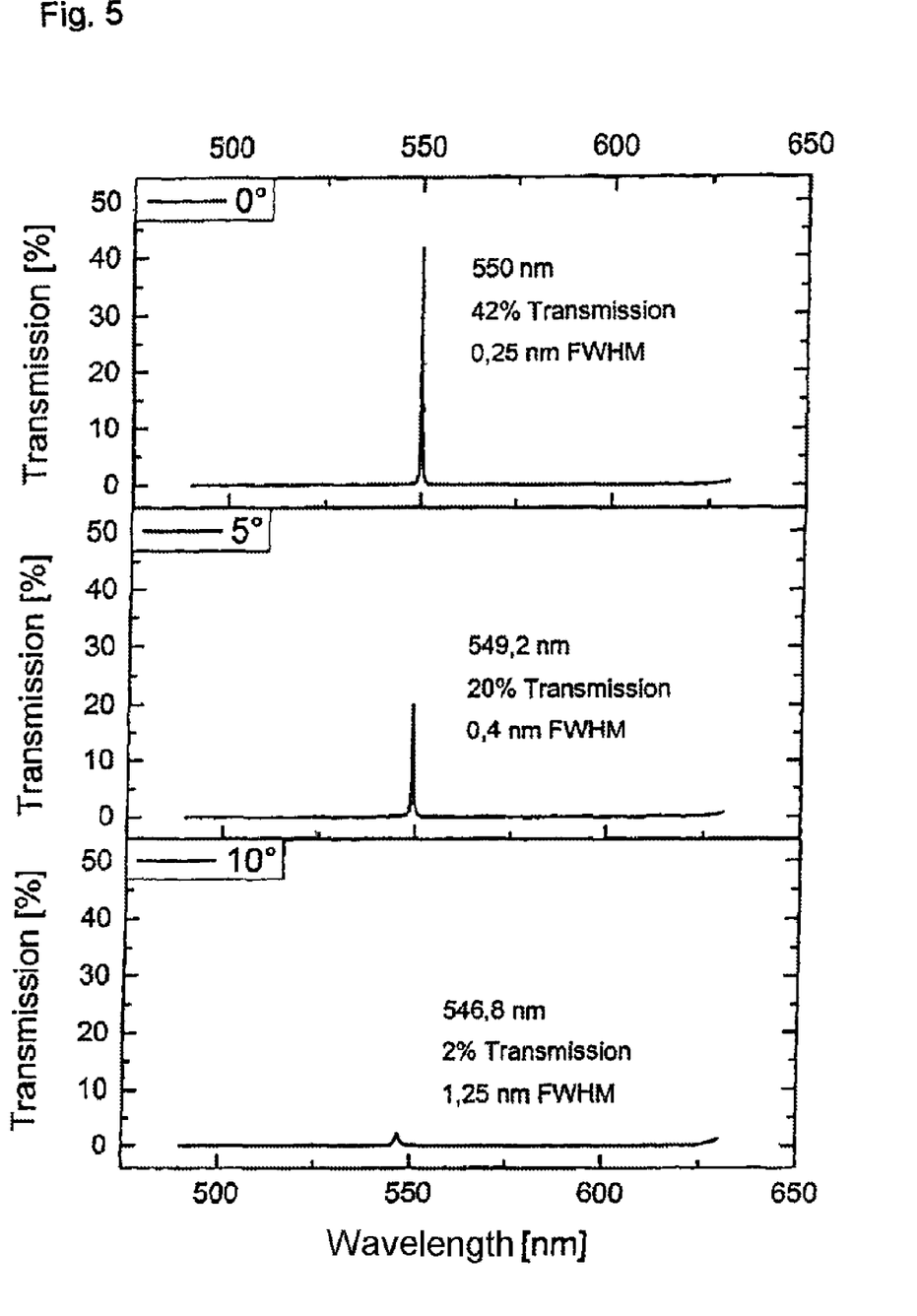
FIG. 5 shows multiple transmission spectra of an optical filter element according to FIG. 1, which are calculated for three angles of incidence, wherein the first surface features a microresonator with titanium dioxide and the second surface features a resonator with a central resonance layer in the form of magnesium fluoride.

FIG. 5 shows an alternative method for the directional selection of the input signal 20 perpendicular to the thickness gradient of the microresonator 10 with reference to three calculated transmission spectrums for different angles of incidence. This figure shows a transmitted mode within the otherwise spectrally non-transparent wavelength range (stop-band). The filter element 50 features a resonance layer 5 of the highly refractive material titanium dioxide (n=2.1) with a thickness of 550 nm/($2n_{titanium\ dioxide}$) on its first side and a low-refraction microresonator 11 of magnesium chloride (n=1.35) with a thickness of (3·550 nm)/$2n_{magnesium\ fluoride}$ on its second side. The gradient is symmetric to the substrate 1 such that the modes of both microresonators 10 and 11 correspond in accordance with FIG. 2a and FIG. 2c under perpendicularly incident light. As the angle of incidence increases (at 5° and 10°), the resonance shifts toward shorter wavelengths as expected, but the signal strength simultaneously also decreases because both parabolas increasingly separate from one another due to the different dispersion.

In comparison with the transmission under perpendicularly incident light, the spectral resolution is broadened in the direction of shorter wavelengths by this effect, but can still be realized small (<1 nm) in accordance with the specific design of the filter element 50.

In a simulation carried out with a microresonator 10 consisting of 7.5 pairs of alternating silicon dioxide and titanium dioxide layers (with a thickness of 550 nm/($4n_{material}$), it was determined that a reduction increases the potential signal strength, but diminishes the effect of the angular selection and thereby reduces the spectral resolution.

In contrast to the realization of the component 60 in accordance with FIGS. 4a, 4b, no additional elements for restricting the signal perpendicular to the layer gradient are required in this case. In this way, the component 60 can also be realized in an extensively planar fashion such that it is suitable for carrying out the spectral detection along a location coordinate or mapped angular coordinate by means of a matrix detector.

Figure 6:
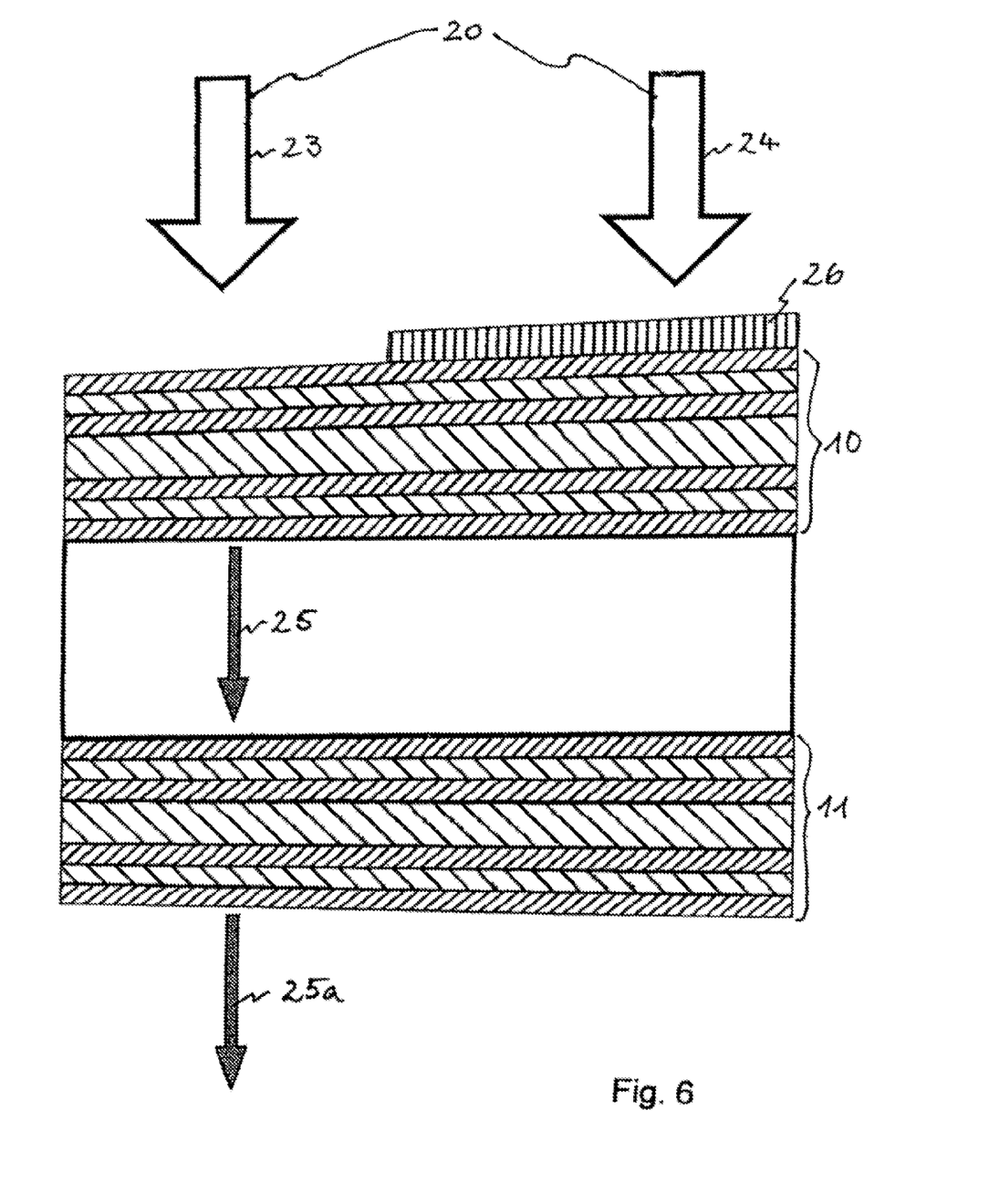
FIG. 6 shows a schematic representation of the local restriction of the input signal by means of a variably absorptive or reflective preliminary filter.

FIG. 6 schematically shows how an input signal 20 in the positions 23, 24, which spectrally exceeds the non-transparent wavelength range (stop-band), can still be positively detected with the described component 60. In a first position 23 of the input signal 20, the spectrally wide input signal 20 lies within the boundaries of the stop-band. After the signal has passed through the microresonators 10, 11, it can be detected in accordance with the principles of an intermediate signal 25 and an output signal 25a described above with reference to the preceding embodiments. In a second position 24 of the input signal 20, the spectrally wide input signal 20 crosses the boundary of the stop-band such that a positive allocation of the detectable signal 25a is no longer possible (either resonant mode or transmitted light outside the stop-band). This is the reason why the part of the spectrum, which lies outside the respective stop-band, is suppressed by means of a locally variable filter element arranged upstream. The filter element 26 can act absorptive (e.g.: functional dyes), as well as reflective (band-pass filter). Discrete steps, as well as layer gradient profiles, may be considered for the local arrangement of the filter element 26.

Figure 7:
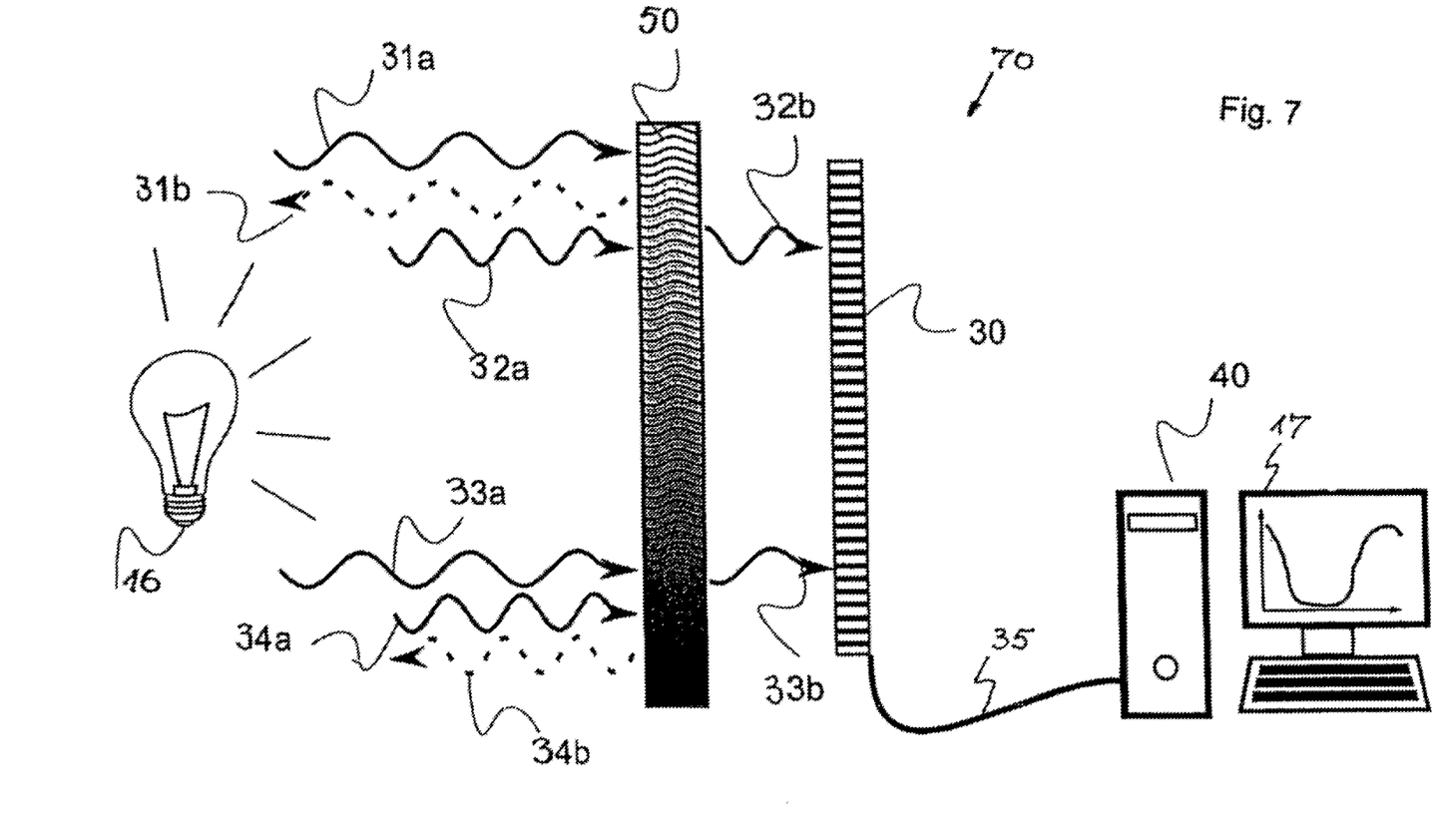
FIG. 7 shows a schematic representation of a spectroscopic/spectrometric device.

FIG. 7 shows a spectroscopic/spectrometric device 70 for converting spectral information into location information, which comprises at least
- a light source 16,
- a detector 30,
- an evaluation unit 40 that is connected to the detector 30 via a connecting line 35,
- a display unit 17 and
- an above-described inventive filter element 50, wherein the filter element 50 is designed in such a way that it transmits a short-wave component 32b of the light from the light source 16 in the region transparent for short waves after the light passes through the filter element 50 and a long-wave component 33b of the light from the light source 16 in the region transparent for long waves after the light passes through the filter element 50, and that it reflects a long-wave component 31b of the light from the light source 16 in the region transparent for short waves after the light is incident on the filter element 50 and a short-wave component 34b of the light from the light source 16 in the region transparent for long waves after the light is incident on the filter element 50.

The following light components are illustrated in FIG. 7
- a long-wave component 31a of the light from the light source 16 prior to the incidence on the filter element 50 in the region transparent for short waves,
- a long-wave component 31b of the light from the light source 16 after the incidence on the filter element 50 in the region transparent for short waves,
- a short-wave component 32a of the light from the light source 16 prior to passing through the filter element 50 in the region transparent for short waves,
- a short-wave component 32b of the light from the light source 16 after passing through the filter element 50 in the region transparent for short waves,
- a long-wave component 33a of the light from the light source 16 prior to passing through the filter element 50 in the region transparent for long waves,
- a long-wave component 33b of the light from the light source 16 after passing through the filter element 50 in the region transparent for long waves,
- a short-wave component 34a of the light from the light source 16 prior to the incidence on the filter element 50 in the region transparent for long waves, and
- a short-wave component 34b of the light from the light source 16 after the incidence on the filter element 50 in the region transparent for long waves.

The inventive filter element 50 for a spectrometer 70 has the following advantages: The inventive design makes it possible to realize particularly space-saving spectrometers 70 in the propagation direction of the light signal because the size of the spectrometer 70 is at a minimal spacing between the filter element 50 and the detector 30 defined exclusively by their vertical dimensions.

If a two-dimensional element (matrix) is used for the detector 30, it is possible to enhance the signal quality (integration) or to carry out a location/angle-dependent spectral measurement depending on the optical configuration on the input side.

The use of dielectric materials makes it possible to achieve a high sensitivity (resonance transmission near 100%) and at the same time a high selectivity (narrow half width of the signal) and a favorable SNR (spectral environment of the resonance with transmission <0.1%). The resolution of the spectrometer can be influenced by selecting the lateral dimensions of the filter element/detector combination and the density of the detector elements accordingly.

The utilization of non-uniform layer thickness profiles makes it possible to manufacture specific spectrometers with different measuring ranges in one device (e.g.: rough spectral overview and high-resolution detail). The basic design can also be easily encapsulated and used in particularly stressful environments due to the small number of required components.

Furthermore, the components such as the high-resolution detectors 30 are in the meantime mass-produced items and the filter elements 50 can be manufactured in large quantities parallel thereto such that low overall costs of a spectrometer 70 with the inventive optical filter element 50 can be realized.

LIST OF REFERENCE SYMBOLS

1 Substrate
2 Material layer with high refractive index
3 Material layer with low refractive index
4 First layer stack/first reflector
5 First resonance layer
6 Second layer stack/second reflector
7 Second resonance layer
8 Layer stack/reflector
9 Layer stack/reflector
10 First microresonator
11 Second microresonator
12 Incident signal
13 Input signal
14 Intermediate signal
14a Output signal
15 Reflected signal component
15a Transmitted signal component
16 Light source
17 Display unit
18 First wall element
19 Second wall element
20 Input signal
21 Horizontal axis of filter element
22 Obliquely incident signal
22a Absorbed signal 23 Position
24 Position
25 Intermediate signal
25a Output signal
26 Filter element
30 Detector
31a Long-wave component of the light prior to the incidence on the filter element in the region transparent for short waves
31b Long-wave component of the light after the incidence on the filter element in the region transparent for short waves
32a Short-wave component of the light prior to passing through the filter element in the region transparent for short waves
32b Short-wave component of the light after passing through the filter element in the region transparent for short waves
33a Long-wave component of the light prior to passing through the filter element in the region transparent for long waves
33b Long-wave component of the light after passing through the filter element in the region transparent for long waves
34a Short-wave component of the light prior to the incidence on the filter element in the region transparent for long waves
34b Short-wave component of the light after the incidence on the filter element in the region transparent for long waves
35 Connecting line
40 Evaluation unit
50 Filter element for converting spectral information into location information
51 First surface
52 Second surface
53 First filter element side
54 Second filter element site
60 Component
70 Spectroscopic device
h Thickness of substrate
d Thickness of resonance layer
α Propagation angle
n Refractive index

The invention claimed is:

1. An optical filter element for converting spectral information into location information with a connected detector for detecting signals, comprising at least two microresonators,
wherein each microresonator comprises:
at least two surface-covering reflective layer structures comprising at least one material layer with a high refractive index and at least one material layer with a low refractive index in an alternating sequence, and
at least one surface-covering resonance layer arranged between the two respective surface-covering reflective layer structures,
wherein:
the filter element comprises at least
a transparent, plane-parallel substrate for optically decoupling the two microresonators,
the first microresonator is located on a first of the two opposite surfaces of the substrate,
the second microresonator is located on the substrate on a second surface thereof, which lies opposite of the first surface, and
the resonance layer of at least one microresonator and/or the respective reflective layer structure surrounding the resonance layer have a variable layer thickness along a horizontal axis of the filter element.

2. The optical filter element according to claim 1, wherein:
at least one section of the reflective layer structure and/or at least one resonance layer comprises a dielectric material.

3. The optical filter element according to claim 1, wherein:
at least one of the reflective layer structures comprises a layer stack comprising optically transparent materials with a high refractive index and a low refractive index in an alternating sequence.

4. The optical filter element according to one of claim 1, characterized in that at least one resonant mode of the microresonators has a transmittance greater than 10%.

5. The optical filter element according to claim 1, wherein:
the geometric design and/or the material composition of both microresonators are realized symmetric to a plane of the substrate.

6. The optical filter element according to claim 1, wherein:
a layer thickness profile of the reflective layers in the filter element along a horizontal axis of the component or filter element is correlated with a profile of the resonance layer thickness.

7. The optical filter element according to claim 1, wherein:
that the first resonance layer of the first microresonator comprises a different dielectric material than the second resonance layer of the second microresonator such that the resonant mode(s) respectively has/have a dispersion parabola with different curvatures.

8. The optical filter element according to claim 1, wherein:
the surface of the substrate has comparatively small dimensions perpendicular to a direction of a gradient of the layer.

9. The optical filter element according to claim 1, wherein:
that elongated absorptive wall elements are arranged on the sides of the filter element referred to a direction of irradiation.

10. The optical filter element according to claim 1, wherein:
a locally variable optical filter element, in which a spectral preselection of an incident signal is carried out by means of absorptive, transmissive or reflective bandpass filters, is arranged upstream of one of the microresonators.

11. The optical filter element according to one of claim 1, characterized in that at least one resonant mode of the microresonators has a transmittance greater than 50%.

12. The optical filter element according to one of claim 1, characterized in that at least one resonant mode of the microresonators has a transmittance greater than 90%.

13. A spectroscopic/spectrometric device for converting spectral information into location information, comprising at least
a light source,
a detector,
an evaluation unit that is connected to the detector via a connecting line,
a display unit and
a filter element according to claim 1, wherein:

the filter element transmits a short-wave component of light from the light source in a region transparent for short waves after the light passes through the filter element and a long-wave component of the light from the light source in a region transparent for long waves after the light passes through the filter element, and the filter element reflects a long-wave component of the light from the light source in the region transparent for short waves after the light is incident on the filter element and a short-wave component of the light from the light source in the region transparent for long waves after the light is incident on the filter element.

14. The spectroscopic/spectrometric device according to claim 13, wherein:

the detector comprises a photoelectric series/matrix converter that is based on a CCD, a photodiode or a multiplier.

* * * * *